Jan. 18, 1966  R. M. ASHBY  3,229,534
ELECTRONIC SMOOTHING SYSTEM
Filed Dec. 12, 1952  3 Sheets-Sheet 1

INVENTOR.
ROBERT M. ASHBY
BY
William L. Lane
ATTORNEY

INVENTOR.
ROBERT M. ASHBY
BY
William L. Peine
ATTORNEY

*INVENTOR.*
ROBERT M. ASHBY
BY William R. Lane

United States Patent Office 3,229,534
Patented Jan. 18, 1966

3,229,534
ELECTRONIC SMOOTHING SYSTEM
Robert M. Ashby, Pasadena, Calif., assignor to North American Aviation, Inc.
Filed Dec. 12, 1952, Ser. No. 325,655
13 Claims. (Cl. 74—5.34)

This invention relates to smoothing systems, and particularly to an electronic smoothing system for eliminating the ripple drift of a self-compensating gyro stabilized platform.

A self-compensating gyro stabilized platform is disclosed in co-pending patent application Serial No. 200,234, filed December 11, 1950 in the name of Darwin L. Freebairn et al., entitled "Self-Compensating Gyro Apparatus" and now abandoned. Each axis of stabilization of this platform is alternately controlled by two reversible gyroscopes. While one of the two gyroscopes is in control of the axis of stabilization, the other gyroscope is caged. Appropriate switching arrangements reverses the direction of rotation of the rotor of the caged gyroscope. A gyroscope is caged when a pickoff on an axis actuates a torquer on the same axis to oppose any movement of the gyroscope about that axis. The input axes of the two gyroscopes are positioned parallel to the axis of stabilization they control. A complete periodic cycle of operation of the control of a single axis of stabilization is divided into four periods. As an example, calling the two reversible gyroscopes "gyro #1" and "gyro #2," assume gyro #2 controls the axis of stabilization during the first period, and that the rotor of gyro #2 is rotating in a positive direction. During the second period cycle, gyro #2 is caged, and the spin direction of its rotor reversed without affecting the orientation of the gyroscope. During the third period, gyro #2 (with its rotor spinning in a negative direction) controls the axis of stabilization. During the fourth period, gyro #2 is caged, and the spin direction of its rotor is again reversed. Similarly, gyro #1 is caged and reversed during the first and third periods and in control of the axis of stabilization during the second and fourth periods.

Regardless of how perfectly a gyroscope is constructed, certain disturbing torques are bound to be present, causing the platform of the gyroscopic system to drift progressively. These disturbing torques, which include bearing, lead-in, and unbalance torques, are divided into two component parts. The first and largest part comprises torques which are independent of the rotor's spin direction. The second part comprises torques which are a function of the rotor's spin direction. The smoothing system contemplated by this invention compensates for the disturbing torques which are independent of the rotor's spin direction.

The generalized equation relating to disturbing torques of a gyroscope and the drift rate of a platform for a single gyroscopic system is $$M_u = H\dot{\phi}$$

where $M_u$ is the resultant disturbing torque, including bearing, lead-in, and unbalance torques; $H=I\omega$ is the angular momentum of the gyroscope's rotor; and $\dot{\phi}$ is the drift rate of the platform. If torque $M_u$ and angular momentum H are independent of time, the drift angle, $\phi$, during a given period of time, $t$, is $$\phi = \int \frac{M_u}{H} dt = \frac{M_u}{H} t$$

When a system is devised whereby the angular momentum, H, of the gyroscope rotor is periodically reversed in sign, a cancellation of the drift angle is achieved. Assume, as an example, a reversible gyroscope subjected to a disturbing torque, $M_u$, which is independent of the spin direction of the gyroscope's rotor. This gyroscope's rotor has a fixed moment of inertia, I, and rotates at an angular velocity which is constant in magnitude, although reversible in direction. Consider the angular velocity as $\omega_a$ during time $t_a$, and $\omega_b$ during time $t_b$ where $\omega_a = -\omega_b$. During time interval, $t_a$, the drift angle, $\phi_a$, is $$\phi_a = \frac{M_u}{I\omega_a} t_a$$

During time interval, $t_b$, with the direction of rotation of the rotor reversed, the drift angle, $\phi_b$, is $$\phi_b = \frac{M_u}{I\omega_b} t_b$$

The total drift angle at the end of times $t_a$ and $t_b$ is the sum of $\phi_a$ and $\phi_b$, or $$\phi_a + \phi_b = \frac{M_u}{I\omega_a} t_a + \frac{M_u}{I\omega_b} t_b$$

If $$\frac{M_u}{I\omega_a} t_a = -\frac{M_u}{I\omega_b} t_b$$

it is seen that the total drift angle, the sum of $\phi_a$ and $\phi_b$, is zero. This is accomplished by an appropriately timed switching arrangement making $$\frac{t_a}{\omega_a} = -\frac{t_b}{\omega_b}$$

It is to be noted that normally the total drift angle is equal to zero only twice during a single cycle of operation. In view of the comparatively long periods of time which are involved, the deviations of $\phi$ from zero are undesirable. This periodic deviation of $\phi$ from a zero value is known as ripple drift. It is the purpose of the smoothing system contemplated by this invention to eliminate this ripple drift.

It is therefore an object of this invention to provide an electronic smoothing system for a self-compensating gyro stabilized platform.

It is another object of this invention to provide an electronic smoothing system to eliminate a periodic ripple signal from two redundant signals.

It is another object of this invention to provide electronic means for eliminating the ripple drift of a self-compensating gyro stabilized platform caused by disturbing torques which are independent of the rotor spin direction of the platform's gyroscopes.

It is a further object of this invention to provide electronic means for compensating for the unknown error torques which originate in the gyroscope or gyroscope precession axis bearing and which are independent of the spin direction of the gyroscope.

It is a further object of this invention to provide an electronic smoothing system which utilizes low leakage capacitors to store voltages useful to actuate corrective torquers in a manner to automatically and continuously counteract the undesired disturbing torques acting on a gyroscope.

It is another object of this invention to provide in a gyro stabilized platform means for charging low leakage capacitors to voltages which are a function of selected torques, means for selectively summing the charges on those capacitors, and means for continuously actuating corrective torquers in response to the appropriately summed charges to thereby continuously and exactly counteract all disturbing torques which tend to cause a ripple drift of an axis of stabilization of the platform.

Other objects of this invention will become apparent from the following description taken in connection with the accompanying drawings, in which FIG. 1 is a graphic plot of the platform drift angle versus time, for a single cycle of operation of a self-compensating gyro stabilized platform without a smoothing system;

Figure 3:
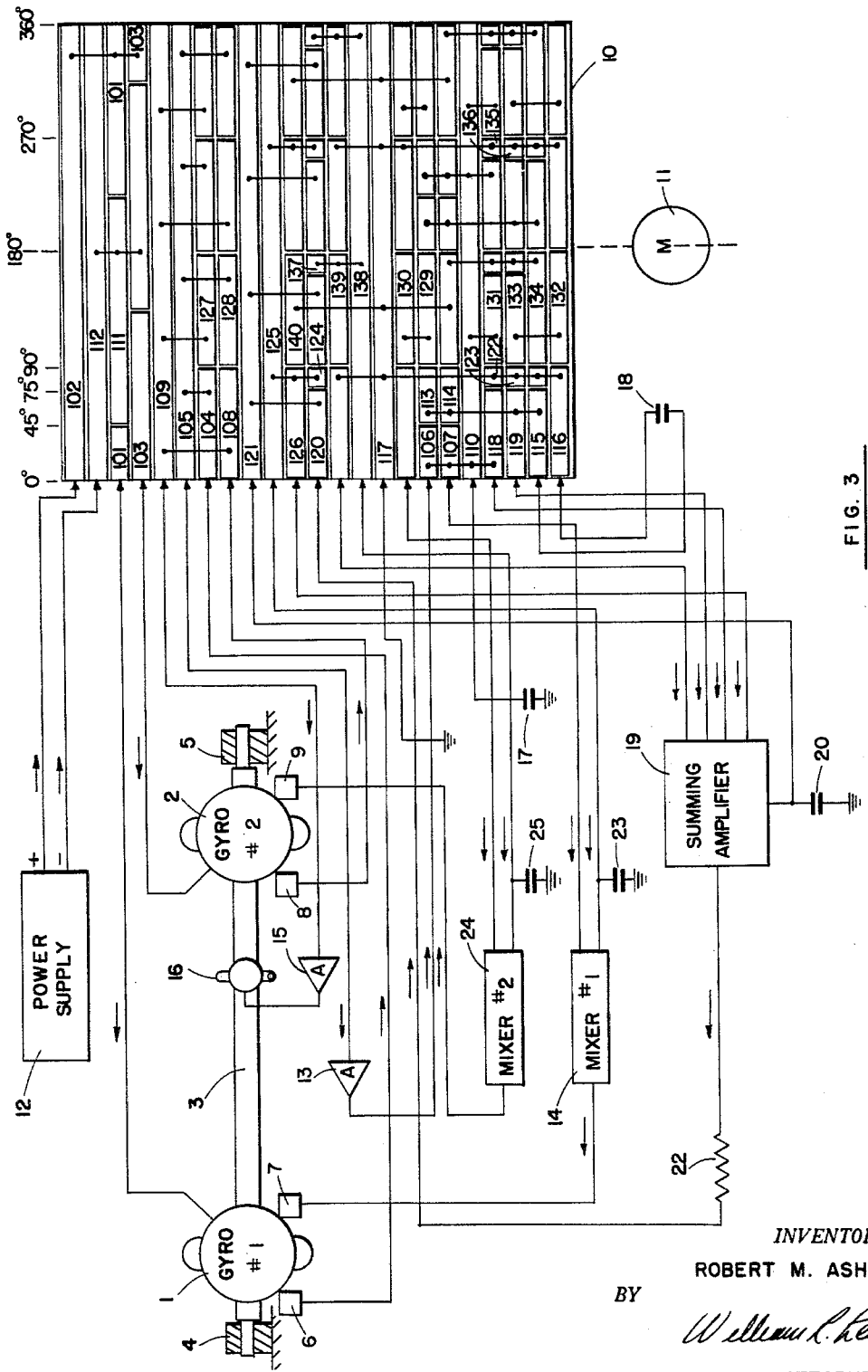
FIG. 3 is a schematic drawing of the electronic smoothing system contemplated by this invention.
Figure 4:
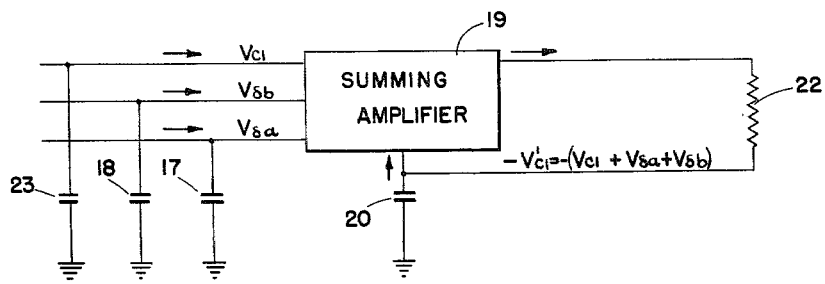
FIG. 4 is a schematic drawing showing the inputs and outputs of the summing amplifier component of FIG. 3 during a summing operation.
Figure 5:
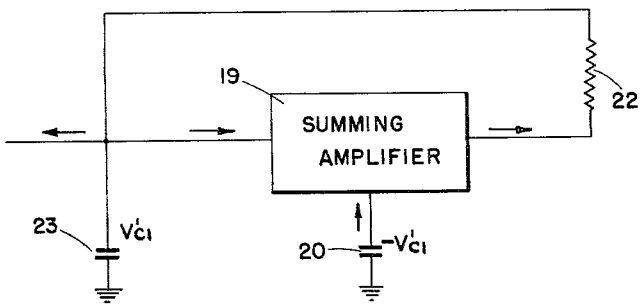
FIG. 5 is a schematic drawing of the connections to the summing amplifier after completion of a summing operation.
Figure 6:
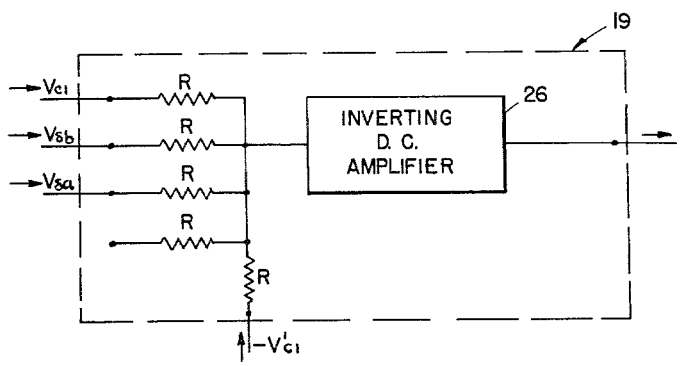

And FIG. 6 is a schematic drawing of a summing amplifier useful in the circuits of FIGS. 3, 4 and 5.

Figure 1:
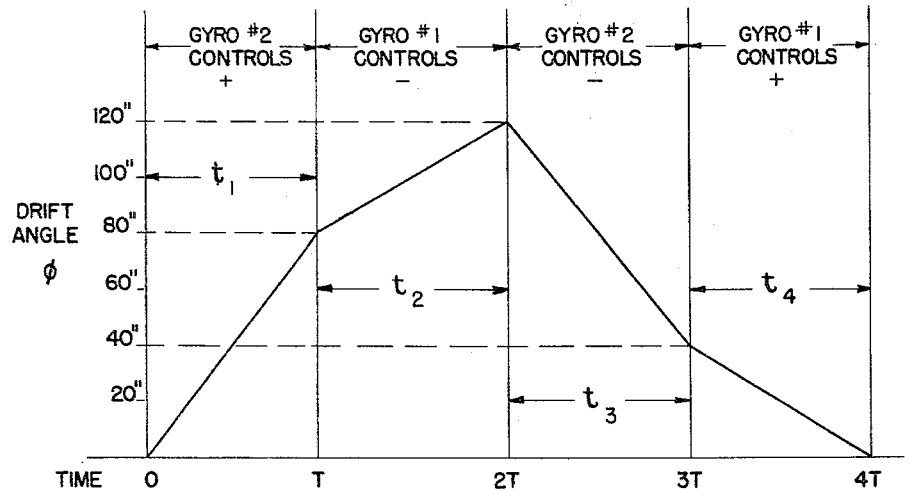
Figure 2:
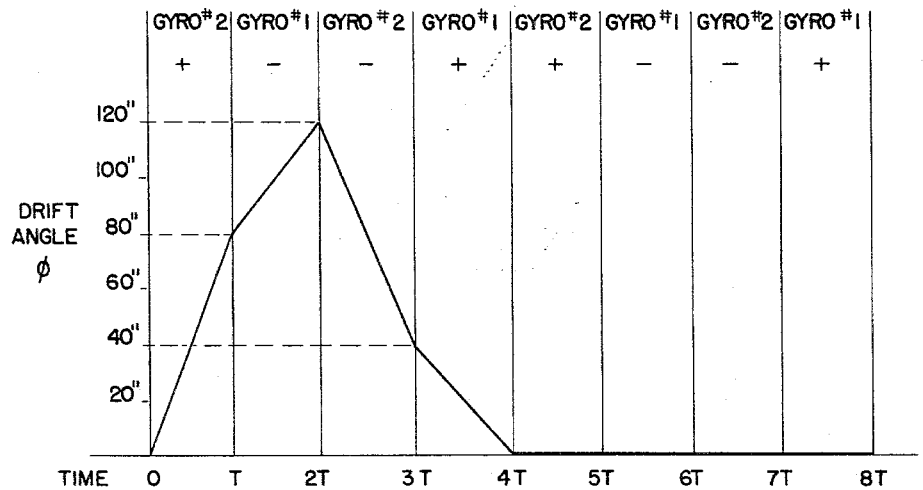
FIG. 2 is a graphic plot of the platform drift angle versus time, for the first two cycles of operation of a self-compensating gyro stabilized platform utilizing the electronic smoothing system contemplated by this invention.

Referring to FIG. 1, the ripple drift of one axis of stabilization of a self-compensating gyro stabilized platform without the smoothing system is shown. A cycle of operation is divided into four periods of time: $t_1$, $t_2$, $t_3$, and $t_4$. During times $t_1$ and $t_3$, gyro #2 is connected to control the axis of stabilization, while gyro #1 is caged. During times $t_2$ and $t_4$, gyro #1 is connected to control the axis of stabilization, while gyro #2 is caged. Since the direction of rotation of the rotor of gyro #2 is reversed during times $t_2$ and $t_4$, the drift angle $\phi_1$ during time $t_1$ due to disturbing torques which are independent of the rotor's spin direction is in the opposite direction to the drift angle $\phi_3$ during time $t_3$. The reversal of the spin direction of the rotor of gyro #1 during times $t_1$ and $t_3$ causes drift angle $\phi_2$ to be opposite in direction to drift angle $\phi_4$. The times are adjusted so that $t_1=t_3$ and $t_2=t_4$. This makes the drift angle $\phi_1$ approximately equal and opposite to drift angle $\phi_3$, and drift angle $\phi_2$ approximately equal and opposite to drift angle $\phi_4$. Since these drift angles are due to disturbing torques acting on each gyroscope, elimination of the effect of the disturbing torques by continuously applying equal and opposite corrective torques to each gyroscope reduces all of the drift angles to zero. The resulting plot of drift angle versus time is then as indicated during the second cycle of FIG. 2.

The problem is to find the magnitude of the disturbing torques, to store this information, and to apply a counter torque to the proper gyroscope during the appropriate time interval and in the appropriate direction to exactly counteract the effect of the disturbing torques. Consider the control of the platform axis of stabilization exclusive of the smoothing system. During time $t_1$ gyro #2 is in control, and gyro #1 is caged. During all of the time $t_1$ the rotor of gyro #2 is spinning in an assumed positive direction. The rotor of gyro #1 is initially spinning in an assumed positive direction, but, by an appropriate switching arrangement, the direction of rotation of the rotor is reversed. Time $t_1$ is therefore divided into two sub-times, $t_{1a}$ and $t_{1b}$. Sub-time $t_{1a}$ is the time during the first quarter cycle when the rotor of gyro #1 is rotating in a positive direction, while sub-time $t_{1b}$ is the time during the first quarter cycle when the rotor of gyro #1 is rotating in a negative direction.

The torque, $M_{1a}$, tending to rotate gyro #1 about its precession axis during time $t_{1a}$ is given by the following equation:

$$M_{1a} = M_{u1} + H_1 \dot{\phi}$$

where $M_{u1}$ is the total disturbing torque acting on gyro #1 due to the imperfect construction of gyro #1; $H_1$ is the angular momentum of the rotor of gyro #1; and $$\dot{\phi} = \frac{M_{u2}}{H_2}$$

is the drift rate of the axis of stabilization caused by the action of disturbing torques $M_{u2}$ on gyro #2. The rotor of gyro #2 has an angular momentum, $H_2$. Therefore, by substitution $$M_{1a} = M_{u1} + \frac{H_1}{H_2} M_{u2} \tag{1}$$

The torque $M_{1b}$ about the precession axis of gyro #1 during time $t_{1b}$ is given by the following equation:

$$M_{1b} = M_{u1} - H_1 \dot{\phi}$$

The negative sign is due to the reversal of the angular velocity component of $H_1$. Since gyro #2 continuously spins in one direction, the sign of $H_2$ does not change. Therefore, $$M_{1b} = M_{u1} - \frac{H_1}{H_2} M_{u2} \tag{2}$$

The two gyroscope rotors are designed with exactly the same moment of inertia, and since they are driven at the same speed, their angular velocities are identical. Therefore, $H_1 = H_2$, and Equations 1 and 2 reduce to $$M_{1a} = M_{u1} + M_{u2} \tag{3}$$
$$M_{1b} = M_{u1} - M_{u2} \tag{4}$$

Adding and subtracting Equations 3 and 4, the disturbing torques, $M_{u1}$ and $M_{u2}$ of gyro #1 and gyro #2, respectively, are found.

$$M_{u1} = \frac{1}{2}(M_{1a} + M_{1b}) \tag{5}$$
$$M_{u2} = \frac{1}{2}(M_{1a} - M_{1b}) \tag{6}$$

From Equation 5 it is evident that by adding the torques tending to rotate caged gyro #1 about its precession axis during times $t_{1a}$ and $t_{1b}$, twice the value of the undesired disturbing torques acting on gyro #1 is obtained. Similarly by subtracting the same two torques, twice the value of the undesired disturbing torques acting on gyro #2 is obtained. Since the two torques to be added or subtracted are only measurable during different intervals of time, provision must be made to store temporarily information relating to at least one of the torques. Furthermore, provision must be made to actuate, in response to this sum or difference, a corrective torquer on each gyroscope to oppose continuously the effect of each of the disturbing torques.

Referring now to FIG. 3, the electronic smoothing system contemplated by this invention is shown. Gyros 1 and 2 are constructed with three orthogonal axes which are called the spin axis, the input axis, and the precession axis. Gyro 1 and gyro 2 are positioned with their input axes along the center line of shaft 3. The center line of shaft 3 is coincident with the axis of stabilization to be controlled by gyros 1 and 2. Shaft 3 is supported by bearings 4 and 5 which are attached to a fixed structure. Gyro 1 is provided with pickoff 6 and torquer 7 positioned on its precession axis. Gyro 2 is provided with pickoff 8 and torquer 9 positioned on its precession axis. Pickoffs 6 and 8 detect movement about the precession axes of their respective gyroscopes. Torquers 7 and 9 apply torques, in response to an electric signal, about the precession axes of their respective gyroscopes.

The switching sequencing is accomplished by cylindrical strip drum 10 which is similar to that described in the above-mentioned patent application and which is rotated at a constant speed by synchronous motor 11. Precautions must be taken to provide ample insulation between the strips of the drum switch or between the various contacts of any other switching means used as an equivalent in order to insure against leakage of the charges on the various storage capacitors. Brushes, indicated by arrow-heads, make electrical contact with the strips. Drum 10 is shown for convenience as a flat piece, but is preferably cylindrical. The operation of the smoothing system can best be explained by following through a complete cycle of operation. One complete revolution of drum 10, lasting about 400 seconds, completes a cycle of operation. The cycling is repeated in the same manner throughout the operation of the platform apparatus.

The rotor motor of gyro 1 is initially connected to the positive terminal of power supply 12 through strips 101 and 102. The rotor motor of gyro 2 is also initially connected to the positive terminal of power supply 12 through strips 103 and 102. Strip 101 ends after 45 degrees rotation of drum 10. The rotor motor of gyro 1 is then connected to the negative terminal of power supply 12 through strips 111 and 112. The spin direction of the rotor of gyro 1 is therefore reversed after the 45-degree point. Similarly, the rotor of gyro 2 is reversed after 135 degrees rotation of drum 10, the rotor of gyro 1 is again reversed after 225 degrees rotation, and the rotor of gyro 2 is reversed after 315 degrees rotation of drum 10. Therefore gyro 1 has a positive spin direction from 0°–45° and 225°–360°, and a negative spin direction from 45°–225°. Gyro 2 has a positive spin direction from 0°–135° and 315°–360°, and a negative spin direction from 135°–315°.

Control of the axis of stabilization is accomplished by selectively connecting the platform torquer 16 to the outputs of pickoffs 6 and 8. Platform torquer 16 is responsive to the output of amplifier 15. The input to amplifier 15 is initially connected to pickoff 8 of gyro 2 through strips 108 and 109. Gyro 2 is thus in control of the axis of stabilization until strip 108 is ended after 90 degrees rotation of drum 10. After the 90-degree point, amplifier 15 is connected to pickoff 6 of gyro 1 through strips 127 and 109. Gyro 1 is thereby placed in control of the axis of stabilization for the next quarter-cycle of operation. A similar switching arrangement at 180° and 270° changes the control of the axis of stabilization back to gyro 2 and then to gyro 1, respectively. Gyro 2 therefore controls the axis of stabilization during the first and third quarter-cycles of operation. Gyro 2 has a positive spin direction during the first quarter-cycle and a negative spin direction during the third quarter cycle. Gyro 1 controls the axis of stablization during the second and fourth quarter-cycles of operation. Gyro 1 has a negative spin direction during the second quarter-cycle, and a positive spin direction during the fourth quarter-cycle.

When one of the gyroscopes is controlling the axis of stabilization, the other gyroscope is caged. Therefore, during the first quarter-cycle of operation, pickoff 6 of gyro 1 is connected to caging amplifier 13 through strips 104 and 105. The output of caging amplifier 13 is connected to mixer 14 through strips 106 and 107 or strips 113 and 114. The output of mixer 14 actuates torquer 7 to exert a torque about the precession axis of gyro 1 in a direction and magnitude to exactly counteract the torque, $M_{1a}$ or $M_{1b}$, tending to rotate gyro 1 about its precession axis. During the second quarter-cycle of operation, pickoff 8 of gyro 2 is connected to caging amplifier 13 through strips 128 and 105. The output of caging amplifier 13 is connected to mixer 24 through strips 129 and 130. The output of mixer 24 actuates torquer 9 to exert a torque about the precession axis of gyro 2 in a direction and magnitude to exactly counteract the torques tending to rotate gyro 2 about its precession axis. The caging sequence is repeated during the third and fourth quarter-cycles of operation.

Thus far the switching arrangement described accomplishes the periodic alternation of the control function between the gyroscopes, the caging of the gyroscope which is not performing the control function, and the reversal of the spin direction of the rotors of gyroscopes while in a caged condition. Smoothing of the ripple drift is accomplished by the storing of information signals proportional to appropriately selected torques, by the selective summing of these signals, and by continuously applying torques about the precession axes of the appropriate gyroscopes in response to the summed signals to thereby continuously compensate for those disturbing torques which are independent of the spin direction of the rotors of the gyroscopes. In the preferred embodiment of this invention, storage of the signals is accomplished by charging low leakage capacitors, such as polyresin capacitors, to voltages which are proportional to the selected torques.

Referring to Equation 5 above, the disturbing torque $M_{u1}$ of gyro 1 is found to be $$M_{u1} = \tfrac{1}{2}(M_{1a} + M_{1b})$$

where $M_{1a}$ is the torque about the precession axis of caged gyro 1 with a positive rotating rotor, and $M_{1b}$ is the torque about the precession axis of caged gyro 1 with a negative rotating rotor, both being measured while gyro 2 is controlling the axis of stabilization. Since the output signal of pickoff 6 during the first and third quarter-cycles is proportional to the changes in torque about the precession axis of caged gyro 1 while gyro 2 is controlling the axis of stabilization, this signal is utilized by the smoothing system of this invention.

Referring to FIG. 3 the output of pickoff 6 during the first 45 degrees rotation of drum 10 is connected to caging amplifier 13 through strips 104 and 105. The output of caging amplifier 13 is a direct current potential. This direct current potential, which we shall call $V_{\delta a}$, is impressed across condenser 17 by means of strips 106 and 110. Condenser 17 is a low leakage capacitor and is capable of holding a charge equal to $V_{\delta a}$ with negligible losses for at least a half cycle of operation. At the 45-degree point the spin direction of the rotor of gyro 1 is reversed as previously described. After a reasonble period of time, the rotor is spinning at a constant speed in a negative direction. The output of pickoff 6 is still connected to caging amplifier 13 through strips 104 and 105. The output of caging amplifier 13 is now another direct-current potential. This direct-current potential, which we shall call $V_{\delta b}$, is impressed across chamber 18 through strips 113 and 115. One side of condenser 18 is connected to ground through strips 116 and 117. Condenser 18 is a low leakage capacitor and continues to hold a charge equal to $V_{\delta b}$ with negligible losses for at least a half cycle of operation.

Referring to FIG. 4, the inputs and outputs of summing amplifier 19 during the first 75 degrees rotation of drum 10 are shown. For convenience the switching contacts are omitted. A previous correction voltage, $V_{c1}$, representing a previous disturbing torque $M_{u1}$, is impressed across condenser 23. The voltages $V_{\delta a}$ and $V_{\delta b}$ measured by pickoff 6 and impressed across condensers 17 and 18, respectively, represent the changes in torque about the precession axis of the caged gyro 1. Therefore, a new correction voltage, $V'_{c1}$, is derived from the addition of $V_{c1}$, $_{\delta a}$ and $V_{\delta b}$. This addition of voltages is accomplished in the preferred embodiment by summing amplifier 19, a preferred circuit of which is detailed in FIG. 6 and whose output is fed through resistor 22 to summing condenser 20. An inverted new correction voltage, $-'_{c1}$, is impressed across condenser 20 in accordance with the following equation:

$$-V'_{c1} = (V-_{c1} + V_{\delta a} + V_{\delta b})$$

This function is accomplished by the circuit of FIG. 3 where during the first 75 degrees rotation of drum 10, condenser 17 is connected to an input terminal of summing amplifier 19 through strips 110 and 118; condenser 18 is connected to a second input terminal of summing amplifier 19 through strips 115 and 119; and condenser 23, the purpose of which is explained later, is connected to a third input terminal of summing amplifier 19 through strips 125 and 126. The other plates of condensers 17 and 23 are connected directly to ground while the other plate of condenser 18 is grounded through strips 116 and 117. The output of summing amplifier 19 is fed through resistor 22, and strips 120 and 121 to summing condenser 20. Summing condenser 20 therefore acquires a charge proportional to the negative sum of the charges across condensers 17, 18, and 23.

Referring to FIG. 5, the connections to summing amplifier 19 from 75 to 90 degrees rotation of drum 10 are shown. For convenience, the switching contacts are again omitted. Corrective condenser 23 is charged to the new corrective voltage $V'_{c1}$ a negative value of which was previously impressed across summing condenser 20. This function is accomplished by the circuit of FIG. 3 where after 75 degrees rotation of drum 10 the connections between condensers 17 and 18 and the terminals of summing amplifier 19 are ended and the terminals connected to ground through strips 122, 123 and 117. The connection from resistor 22 to summing condenser 20 is also broken by the ending of strip 120, and resistor 22 is now connected through strips 124 and 125 to corrective condenser 23. Condenser 23 is thereupon charged to $V'_{c1}$, a voltage which is directly proportional to the disturbing torque $M_{u1}$. This voltage $V'_{c1}$ is continuously connected as an input to mixer 14.

A preferred type of summing amplifier 19 is shown in FIG. 6. During the first 75 degree rotation of drum 10 voltages, $V_{c1}$, $V_{\delta b}$, and $V_{\delta a}$, stored on condensers 17, 18, and 23, are fed as inputs to a high impedance resistance network. Voltage $-V'_{c1}$, stored on summing condenser 20, is fed as a balancing input to the resistance network. All of the resistances, R, have very high impedance and are equal to value. Inverting D.-C. amplifier, 26, is a high gain amplifier and detects any deviation of the common impedance connection from a ground potential. The output of inverting amplifier 26 is fed through resistor 22 to condenser 20 in a manner to raise or lower voltage, $-V'_{c1}$ sufficient to return the common connection to ground potential. The charge across condenser 20 therefore is continuously maintained at a voltage equal to the negative sum of the individual input voltages. After 75 degrees rotation of drum 10, the terminals formerly subjected to input voltages $V_{\delta b}$ and $V_{\delta a}$ are grounded, and the output of inverting amplifier 26 is fed through resistor 22 to condenser 23. The balancing input to the impedance network thereby becomes the voltage on condenser 23 while voltage $-V'_{c1}$ on condenser 20 is fed as sole input to the network. Voltage $V'_{c1}$ is therefore impressed across corrective condenser 23.

Since condenser 23 is a low leakage capacitor, it maintains its charge $V'_{c1}$ for a long time. Acting through mixer 14 this voltage $V'_{c1}$ causes torquer 7 to continuously exert a corrective torque, $M_{c1}$, which exactly compensates for disturbing torque $M_{u1}$. Due to a small unavoidable amount of leakage through condenser 23 and the other circuit components, and also due to any change in the magnitude of disturbing torques, $M_{u1}$, minor corrections must repeatedly be made to the voltage $V'_{c1}$ impressed across corrective capacitor 23. Therefore, the summing operation previously described is repeated between 180 and 270 degrees rotation of drum 10. The voltage on condenser 23, which formerly was called $V'_{c1}$, is now considered an "old" corrective voltage, $V_{c1}$, and a new corrective voltage $V'_{c1}$ is found by the same sequence of operations previously described.

A continuous corrective torque is therefore produced by torquer 7 which automatically compensates for the disturbing torques acting on gyro 1. Provision is made to automatically adjust the output of torquer 7 every 180 degrees of rotation of drum 10 to compensate thereby for any changes in the magnitude of the disturbing torques $M_{u1}$. Any leakages through the component parts affecting the corrective torque of torquer 7 are also automatically compensated for during each 180 degrees rotation of drum 10.

In the smoothing system thus far described, $V'_{c1}$ is the corrective voltage which is found proportional to $M_{u1}$, $V_{\delta a}$ is the change in corrective voltage necessitated by changes in the disturbing torques; while gyro 2 is controlling the axis of stabilization, and $V_{\delta b}$ is the change in the corrective voltage upon reversal of rotation of the rotor of caged gyro 1 necessitated by the changes in the disturbing torques.

Referring to Equation 6 above, the disturbing torque, $M_{u2}$, of gyro 2 is found to be $$M_{u2} = \tfrac{1}{2}(M_{1a} - M_{1b})$$

As previously disclosed, condenser 17 is charged to a voltage $V_{\delta a}$ while condenser 18 is charged to a voltage $V_{\delta b}$, the voltages $V_{\delta a}$ and $V_{\delta b}$ being the changes in the corrective voltage necessitated by changes in the disturbing torques. In order to obtain a corrective voltage, $V'_{c2}$ which is proportional to torque $M_{u2}$, a new summing operation is performed corresponding to the equation $$-V'_{c2} = -(V_{c2} + V_{\delta a} - V_{\delta b})$$

$V_{c2}$ is a previous corrective voltage which is found across condenser 25. In order to obtain a negative $V_{\delta b}$ the connections to condenser 18 are reversed. Condenser 25 is substituted for condenser 23 as an input to summing amplifier 19.

By this switching operation summing condenser 20 is charged to an inverted new corrective voltage $-V'_{c2}$.

This summing operation is performed during the second quarter cycle of operation of the controls of the platform. From 90 to 180 degrees rotation of drum 10, gyro 1 controls the axis of stabilization while gyro 2 is caged. The output of pickoff 6 is used to control platform torquer 16 and no longer is connected to either condenser 17 or 18. Condenser 17, having previously acquired a charge equal to $V_{\delta a}$, is connected through strips 110 and 131 to an input terminal of summing amplifier 19. Condenser 18, having previously acquired a charge equal to $V_{\delta b}$ is electrically inverted. The plate of condenser 18 formerly connected to an input terminal of summing amplifier 19 is now connected to ground through strips 134 and 117. The plate of condenser 18 formerly connected to ground is now connected to the input terminal of summing amplifier 19 through strips 132 and 133. Therefore, while during the first quarter-cycle, a positive voltage, $V_{\delta b}$, was fed into summing amplifier 19, during the second quarter-cycle a negative voltage, $V_{\delta b}$, is fed into summing amplifier 19. Condenser 23, previously charged to voltage $V'_{c1}$, is disconnected from the input terminal of summing amplifier 19 and this input terminal is grounded through strips 140 and 117. The last input terminal of summing amplifier 19 is connected through strips 139 and 138 to condenser 25.

A circuit similar to that of FIG. 4 is thereby obtained for charging summing condenser 20 to an inverted new corrective voltage $-V'_{c2}$. This circuit is changed to one similar to FIG. 5 by appropriate switching when drum 10 is rotated approximately 165 degrees. Thereupon, corrective condenser 25 is charged to the new corrective voltages $V'_{c2}$. $V'_{c2}$ is a voltage which is proportional to the disturbing torques $M_{u2}$. This charge acting through mixer 24 causes actuation of corrective torquer 9 to continuously apply a corrective torque $M_{c2}$ about the precision axis of gyro 2 to exactly counteract the disturbing torques, $M_{u2}$, acting on gyro 2. This corrective torque, $M_{c2}$, continues to be applied throughout the third quarter-cycle of operation when gyro 2 is again in control of the axis of stabilization.

During the third period the electronic smoothing system of this invention once again operates the same as during the first quarter cycle. Condenser 17 and 18 are again charged to voltages $V_{\delta a}$ and $V_{\delta b}$, respectively, which are proportional to the torque unbalances (if any) between the disturbing torque $M_{u1}$ and the corrective torque $M_{c1}$ and between the disturbing torque $M_{u2}$ and the corrective torque $M_{c2}$. If there is unbalance due to any cause, the circuit will automatically apply a new corrective, $M_{c1}$, to the first gyroscope to compensate for the change in the disturbing torques.

Similarly, during the fourth period, the new charges (if any) on condensers 17 and 18 will cause a new corrective torque $M_{c2}$ to be applied to the second gyroscope to compensate for the change in the disturbing torque.

I claim:

1. Means for stabilizing a device about a single axis in space comprising a pair of periodically reversing gyroscopes having their input axes parallel to said single axis in space, means for applying controlling torques to said device about said single axis in space in response to each of said gyroscopes in turn, electronic means responsive to one of said gyroscopes for recording voltages which are functions of such disturbing torques in each of said gyroscopes as are independent of the spin direction of said gyroscopes, and torquing means responsive to said recorded voltages of said electronic means and positioned to continuously apply corrective torques to each of said gyroscopes to compensate for said disturbing torques.

2. Stabilizing means as recited in claim 1 in which said electronic means comprises a pickoff on the precession axis of said gyroscope, a low leakage capacitor coupled to the output of said pickoff while the rotor of said gyroscope is spinning in one direction and said gyroscope is not controlling said single axis in space, a second low leakage capacitor coupled to the output of said pickoff after reversal of the spin direction of the rotor of said gyroscope and while said gyroscope is not controlling said single axis in space, a summing amplifier having an output proportional to the algebraic sum of its inputs, switching means connecting said first and second capacitors as inputs to said summing amplifier in a manner to alternately obtain outputs proportional to the sum and difference of the charges on said capacitors, a third low leakage capacitor selectively coupled to the output of said summing amplifier in a manner to acquire a charge proportional to the sum of the charges on said first and second capacitors, and a fourth low leakage capacitor coupled to the output of said summing amplifier in a manner to acquire a charge proportional to the difference between the charges on said first and second capacitors whereby said last-named capacitors are charged to voltages which are a measure of the separate disturbing torques on said gyroscopes.

3. An apparatus for stabilizing a device about a single axis in space comprising a pair of reversible gyroscopes having their input axes parallel to said single axis in space, means for controlling the orientation of said device alternately in response to each of said gyroscopes, servo means on each of said gyroscopes connected to cage said gyroscope not in control of the orientation of said device, means for periodically reversing the spin direction of each of said gyroscopes when caged, electronic means connected to record voltages which are a function of the torques required to cage each of said gyroscopes during each spin direction, summing means connected to said electronic means in a manner to obtain as separate outputs the algebraic sum of said caging voltages of each gyroscope, electronic means selectively connected to record each of said outputs of said summing means and torquing means selectively subjected to each of said last-named electronic means and positioned to continuously apply a corrective torque to each of said gyroscopes whereby the disturbing torques on said gyroscope which are independent of the spin direction of said gyroscopes are continuously compensated for.

4. An apparatus as recited in claim 3 in which said electronic means for recording voltages comprise low leakage capacitors.

5. An apparatus for stabilizing a device about a single axis in space comprising a pair of reversible gyroscopes having their input axes parallel to said single axis in space, means for controlling the orientation of said device alternately in response to each of said gyroscopes, servo means on each of said gyroscopes connected to cage said gyroscope when not controlling the orientation of said device, means for periodically reversing the spin direction of each of said gyroscopes while caged, electronic means connected to one of said servo means in a manner to separately record voltages which are functions of the torques required to cage one of said gyroscopes during each spin direction, summing means selectively connected to said electronic means in a manner to obtain as separate outputs the algebraic sum and difference of said recorded voltages, electronic means connected to record separately each of said outputs of said summing means, and torquing means selectively subjected to each of said last-named electronic recording means and positioned to continuously apply a corrective torque to each of said gyroscopes whereby the disturbing torques acting on said gyroscopes are continuously compensated for to the extent that said disturbing torques are independent of the spin direction of said gyroscopes.

6. An apparatus as recited in claim 5 in which said electronic recording means comprise low leakage capacitors.

7. In combination with a periodically reversed gyroscope, means for eliminating ripple drift caused by disturbing torques which are not a function of the spin direction of the gyroscope comprising servo means including pickoff means and torquer means connected to cage said gyroscope prior to and immediately after the spin direction of said gyroscope is reversed, electronic storing means sensitive to said pickoff means of said servo means for separately storing charges proportional to the outputs of said pickoff means prior to and immediately after reversal of said gyroscope, summing means connected to said electronic means in a manner to obtain as an output the algebraic sum of said charges, and electronic storing means subjected to the output of said summing means and connected to continuously actuate said torquer means of said servo means whereby said servo means continuously exerts a torque on said gyroscope equal and opposite to said disturbing torques.

8. A device as claimed in claim 7 in which said electronic storing means are capacitors having low leakage.

9. In combination with a periodically reversible gyroscope, means for applying a corrective torque to said reversible gyroscope in opposition to disturbing torques which are independent of the spin direction of said gyroscope comprising a pickoff and a corrective torquer on the precession axis of said gyroscope, switching means periodically caging said gyroscope by connecting said pickoff to said torquer and periodically reversing the spin direction of said gyroscope while caged, a low leakage capacitor coupled to the output of said pickoff while said gyroscope is caged and spinning in one direction, a second low leakage capacitor coupled to the output of said pickoff while said gyroscope is caged and spinning in the opposite direction, a third low leakage capacitor continuously connected to actuate said torquer, a summing amplifier having an output proportional to the sum of its inputs and switching means periodically connecting said first and second capacitors as inputs to said summing amplifier and connecting said third capacitor to the output of said summing amplifier whereby said third-named capacitor is charged to a voltage which is an exact function of said disturbing torques.

10. Apparatus for stabilizing a device about a single axis in space comprising two reversible gyroscopes having input axes parallel to said single axis in space; a main torquer having an output about said single axis in space; a pickoff and a corrective torquer positioned on the precession axis of one of said gyroscopes; a second pickoff and a second corrective torquer positioned on the precession axis of the other of said gyroscopes; switching means alternately connecting the output of said first-named pickoff to said main torquer while connecting the output of said second-named pickoff to said second named corrective torquer and connecting the output of said second-named pickoff to said main torquer while connecting said first-named pickoff to said first-named corrective torquer; a low leakage corrective capacitor connected to continuously actuate said first-named corrective torquer; a second low leakage corrective capacitor connected to continuously actuate said second-named corrective torquer; switching means reversing the spin directions of each of said gyroscopes during the period of time the pickoff of said gyroscope is connected to the corrective torquer; a low leakage storage capacitor coupled to the output of said first-named pickoff only while said pickoff is connected to said corrective torquer and said first gyroscope is spinning in one direction; a second low leakage storage capacitor coupled to the output of said first-named pickoff only while said pickoff is connected to said corrective torquer and said first gyroscope is spinning in the opposite direction; a summing amplifier having a balancing input which is a function of the algebraic sum of its inputs; a low leakage summing capacitor; and switching means in sequence connecting both of said storage capacitors and said first corrective capacitor as inputs and said summing capacitor as the balancing input of said summing amplifier, then connecting said summing capacitor as a sole input and said first corrective capacitor as the balancing input of said summing amplifier, then connecting said second storage capacitor, electrically inverted, said first storage capacitor, and said second corrective capacitor as inputs and said summing amplifier as the balancing input of said summing amplifier; and finally connecting said summing capacitor as a sole input and said second corrective capacitor as the balancing input of said summing amplifier; whereby said first and second corrective torquers continuously apply periodically corrected compensating torques to their respective gyroscopes, thereby continuously and exactly counteracting all of each gyroscope's disturbing torques which are independent of the spin direction of the gyroscope.

11. In combination with a gyroscope having means for periodically reversing the spin direction of said gyroscope, means for eliminating the ripple drift of said periodically reversed gyroscope caused by disturbing torques which are not a function of the spin direction of said gyroscope comprising electronic means responsive to said gyroscope for recording signals which are functions of such disturbing torques in said gyroscope as are independent of the spin direction of said gyroscope, and torquing means responsive to said signals previously recorded by said electronic means and positioned to apply a corrective torque to said gyroscope to compensate for said disturbing torques whereby said gyroscope is subjected to compensating torques equal and opposite to said disturbing torques.

12. Means for stabilizing a device about a single axis in space comprising a pair of periodically reversing gyroscopes having their input axes parallel to said single axis in space, means for applying controlling torques to said device about said single axis in space in response to each of said gyroscopes in turn, signal generating means responsive to at least one of said gyroscopes for generating output signals which are functions of such disturbing torques in each of said gyroscopes as are independent of the spin direction of said gyroscopes, electronic means responsive to said signal generating means for recording the output signals of said signal generating means and torquing means responsive to said recorded signals of said electronic means and positioned to continuously apply corrective torques to each of said gyroscopes to compensate for said disturbing torques.

13. A combination comprising a self-compensating gyro stabilized platform having a plurality of gyroscopes and means for periodically reversing the spin direction of said gyroscopes; torquers positioned to apply torques to each of said gyroscopes of said platform in response to input signals; pickoff means responsive to at least one of said gyroscopes and connected to generate voltages which are functions of the disturbing torques on said gyroscope in each spin direction; electronic storing means connected to said pickoff means in a manner to store voltages which are functions of such disturbing torques in each of said gyroscopes as are independent of the spin directions of said gyroscopes; and means responsive to previously stored voltages in said electronic storing means for actuating said torquers to continuously compensate for said disturbing torques acting on said gyroscopes.

References Cited by the Examiner
UNITED STATES PATENTS

| 2,414,291 | 1/1947 | Evans. |
| 2,553,786 | 5/1951 | Redemski _____ 318—31 |
| 2,591,697 | 4/1952 | Hays _____ 74—5.34 |
| 2,592,417 | 4/1952 | Hale _____ 318—306 |
| 2,620,669 | 12/1952 | Braddon _____ 74—5.4 |
| 2,752,790 | 7/1956 | Draper. |

FOREIGN PATENTS

| 11,040 | 1907 | Great Britain. |

BROUGHTON G. DURHAM, *Primary Examiner.*

SAMUEL BOYD, *Examiner.*

ARTHUR M. HORTON, L. LYON, *Assistant Examiners.*

UNITED STATES PATENT OFFICE
CERTIFICATE OF CORRECTION

Patent No. 3,229,534

January 18, 1966

Robert M. Ashby

It is hereby certified that error appears in the above numbered patent requiring correction and that the said Letters Patent should read as corrected below.

Column 6, line 34, for "chamber" read -- condenser --; line 49, for "$V_{c1,\delta a}$" read -- $V_{c1}, V_{\delta a}$ --; line 54, for "$-/_{c1}$" read -- $-V'_{c1}$ --; same column 6, lines 56 and 57, the equation should appear as shown below instead of as in the patent:

$$-V'_{c1} = (-V_{c1} + V_{\delta a} + V_{\delta b})$$

column 8, line 69, after "corrective" insert -- torque --.

Signed and sealed this 1st day of August 1967.

(SEAL)
Attest:

EDWARD M. FLETCHER, JR.
Attesting Officer

EDWARD J. BRENNER
Commissioner of Patents